United States Patent Office 3,221,047
Patented Nov. 30, 1965

3,221,047
PROCESS OF STABILIZING VINYL
AROMATIC SULFONATES
Henry Volk, 1611 S. Jackson, Bay City, Mich., and
Charles E. Grabiel, 1603 Clover Lane, Midland, Mich.
No Drawing. Filed June 8, 1962, Ser. No. 200,976
4 Claims. (Cl. 260—505)

The present invention relates to vinyl aromatic sulfonates. More especially, it concerns inhibiting deleterious effects that occur in vinyl aromatic sulfonate monomers during storage. The vinyl aromatic sulfonates concerned herein are such as may be prepared according to the procedures of United States Patent 2,821,549.

It is a characteristic of vinyl aromatic sulfonates that, upon storage in the presence of oxygen, they tend to darken or acquire additional color and, under certain conditions, to polymerize, the latter occurring particularly when the monomer is stored in solution form. Such depreciation of the monomer is highly undesirable in that it results in both the loss of monomer and the formation of undesirable by-product impurities.

Accordingly, it is an object of the invention to provide new, inhibited compositions of vinyl aromatic sulfonates, said monomer compositions exhibiting an enhanced resistance, in the presence of aqueous solvents, to polymerization and oxidation by oxygen or oxygen-containing materials with which they may come into contact while being stored. Further objects will become apparent hereinafter as the invention is more fully described.

While the exact mechanism by which such deleterious effects occur in the monomers referred to above is not known, it is believed to be promoted by one or more agents such as oxygen and/or metal ions capable of existing in two valence states such as, for example, iron, copper and the like. Also, it is known that elevated temperatures aggravate such effects and, in fact, in some instances, it is believed that elevated temperatures can be the sole cause of decomposition as described above.

In accordance with the present invention, alkali metal vinyl aromatic sulfonates are stabilized against the deleterious effects of oxygen and thermal energy, which effects occur in the presence of aqueous solvents for the sulfonates, by mixing with the monomers sufficient amounts of an alkali metal hydroxide to provide a pH of at least 11 when the monomer is dissolved in an aqueous solvent. Though relatively small amounts of the alkali metal hydroxide are sufficient to achieve the specified minimum pH, larger amounts up to as much as 0.6 part by weight of the hydroxide per part by weight of monomer can be used effectively.

The vinyl aromatic sulfonate monomers concerned can be characterized by the general formula $$H_2C=\overset{R}{\underset{|}{C}}-Ar-SO_3M$$

wherein R is methyl or hydrogen, Ar is a divalent aromatic group having its valences on nuclear carbon atoms and M is an alkali metal cation. Specific monomers are the alkali metal styrene sulfonates and derivatives thereof having nuclear (ring) substituents such as chlorine, bromine, hydroxyl, alkyl and alkoxy groups, the alkyls containing from 1 to 4 carbons.

To carry out the invention, the alkali metal hydroxide is incorporated into aqueous solutions of the vinyl aromatic sulfonate monomers in any convenient manner. One procedure involves dry blending an effective quantity of the alkali metal hydroxide with the monomer so that when the resulting composition is dissolved in an aqueous solvent the monomer is protected against the aforementioned deleterious consequences. In another procedure, a stabilized alkali metal hydroxide and the monomer are added separately to a common aqueous solvent.

A surprising and most advantageous feature of the present invention is that the vinyl aromatic sulfonates, which have previously undergone deterioration, are rendered stable and effective as monomers by treatment with the alkali metal hydroxide as prescribed above.

EXAMPLE 1

A sufficient amount of sodium styrene sulfonate was dissolved in water to provide a solution containing about 9 percent by weight of the monomer. The pH of the solution as made up was about 7.8. One aliquot of the monomer solution was stored at 25° C. for one week. Residual monomer, determined by a standard bromate-bromide titration technique, indicated that 85 percent of the original monomer had polymerized. With a second aliquot the pH of the monomer solution was adjusted to 11 by the addition of sodium hydroxide. Only 5 percent of the monomer contained in this sample was polymerized after storage for one week at 25° C.

EXAMPLE 2

Additional experiments were carried out to determine the stabilization effect over a wide range of alkali metal hydroxide concentrations. Aqueous solutions of sodium styrene sulfonate were treated with varying amounts of sodium hydroxide. Subsequently, the solutions were heated for 18 hours at 70° C. Measurements were made before and after the heating operation to determine the monomer concentration. As in Example 1, this was done with a standard bromate-bromide potentiometric titration technique for quantitatively determining the presence of vinyl groups. The results of these runs are reported in the following table.

Table 1

| Run | NaOH added [1] | pH | Original monomer (wt. percent) | Monomer after 18 hours at 70° C. (wt. percent) | Remaining active monomer (percent)[2] |
|---|---|---|---|---|---|
| 1 | As required | 9 | 7.92 | 3.42 | 43.3 |
| 2 | ----do---- | 11 | 7.12 | 4.79 | 67.3 |
| 3 | ----do---- | 12 | 7.60 | 6.44 | 84.7 |
| 4 | 0.15 grams | >12 | 7.46 | 6.17 | 82.7 |
| 5 | 0.30 grams | >12 | 7.67 | 6.42 | 83.7 |
| 6 | 3.0 grams | >12 | 7.20 | 5.92 | 82.2 |
| 7 | 5.0 grams | >12 | 7.80 | 5.26 | 67.5 |

[1] This amount was added to 100 milliliters of monomer solution.
[2] This equals the remaining monomer, divided by original monomer, multiplied by 100.

In a similar manner other vinyl aromatic sulfonate monomers, such as potassium styrene sulfonate, sodium ar-vinyl toluene sulfonate, potassium ar-vinyl xylyl sulfonate, sodium ar-vinyl ethyl phenyl sulfonate, potassium ar-vinyl ethoxy phenyl sulfonate, potassium vinyl chlorophenyl sulfonate, potassium ar-vinyl butyl phenyl sulfonate, sodium α-methyl styrene sulfonate and the like vinyl aromatic sulfonates of the benzene series, are stabilized by the addition thereto of an effective amount of an alkali metal hydroxide such as sodium hydroxide or potassium hydroxide.

What is claimed is:

1. A method for treating an alkali metal vinyl aromatic sulfonate to render it stable, which comprises adding to an aqueous solution of the alkali metal vinyl aromatic sulfonate a sufficient amount of an alkali metal hydroxide to produce a pH of at least 11, and not exceeding 0.6 part by weight thereof per part by weight of monomer.

2. A method for treating an alkali metal styrene sulfonate to render it stable, which comprises adding to an aqueous solution of the alkali metal styrene sulfonate a sufficient amount of an alkali metal hydroxide to produce a pH of at least 11, and not exceeding 0.6 part by weight thereof per part by weight of monomer.

3. A method as in claim 1 wherein the alkali metal vinyl aromatic sulfonate is sodium styrene sulfonate.

4. A method as in claim 1 wherein the alkali metal vinyl aromatic sulfonate is potassium styrene sulfonate.

References Cited by the Examiner
UNITED STATES PATENTS

| | | | |
|---|---|---|---|
| 2,821,549 | 1/1958 | Mock | 260—505 |
| 2,822,385 | 2/1958 | Estes | 260—505 |
| 2,822,386 | 2/1958 | Nix | 260—202 |
| 3,088,971 | 5/1963 | Mattano et al. | 260—505 |
| 3,088,972 | 5/1963 | Mattano et al. | 260—505 |

LORRAINE A. WEINBERGER, *Primary Examiner.*

LEON ZITVER, *Examiner.*